US012613529B2

(12) United States Patent
Akatsuka et al.

(10) Patent No.: US 12,613,529 B2
(45) Date of Patent: Apr. 28, 2026

(54) PORTABLE TERMINAL AND VEHICLE CONTROL SYSTEM

(71) Applicant: TOYOTA JIDOSHA KABUSHIKI KAISHA, Toyota (JP)

(72) Inventors: Kosuke Akatsuka, Mishima (JP); Shuichi Tamagawa, Kitanagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 41 days.

(21) Appl. No.: 18/637,614

(22) Filed: Apr. 17, 2024

(65) Prior Publication Data

US 2025/0068167 A1      Feb. 27, 2025

(30) Foreign Application Priority Data

Aug. 25, 2023      (JP) ................................. 2023-137213

(51) Int. Cl.
*G05D 1/223*          (2024.01)
*G05D 1/617*          (2024.01)
      (Continued)

(52) U.S. Cl.
CPC ........... *G05D 1/2232* (2024.01); *G05D 1/617* (2024.01); *H04W 4/025* (2013.01); *H04W 4/40* (2018.02);
      (Continued)

(58) Field of Classification Search
CPC .. G05D 1/2232; G05D 1/617; G05D 2109/10; G05D 2111/30; G05D 2105/22; G05D 2107/13; H04W 4/025; H04W 4/40
      (Continued)

(56) References Cited

U.S. PATENT DOCUMENTS

| | | |
|---|---|---|
| 11,215,982 B2 | 1/2022 | Urano et al. |
| 11,325,618 B2 | 5/2022 | Umeda |

(Continued)

FOREIGN PATENT DOCUMENTS

| | | |
|---|---|---|
| JP | 5671768 B1 | 2/2015 |
| JP | 2019-077527 A | 5/2019 |
| JP | 6986518 B2 | 12/2021 |

OTHER PUBLICATIONS

Virtual Drive, "Cheapest Sim-racing setup ever | Smartphone as steering wheel", Sep. 13, 2020, <https://www.youtube.com/watch?v=Q2zSQTEz42o> (Year: 2020).*

*Primary Examiner* — Krishnan Ramesh
(74) *Attorney, Agent, or Firm* — SoraIP, Inc.

(57)      ABSTRACT

The portable terminal is operated by an operator to operate the vehicle, and performs wireless communication with the vehicle. The portable terminal includes a sensor, a touch panel, and a processor. The sensor detects an inclination direction and an inclination angle of the portable terminal. The touch panel includes a display screen and detects touch of an operator on the display screen. The processor selects one of the first and second operation methods corresponding to the first and second holding methods of the portable terminal by the operator based on orientation information, generates travel control information for vehicle travel control based on the tilting operation of tilting the portable terminal during selection of the first operation method, and generates travel control information based on the tilting operation and the touch operation to a predetermined position on the display screen during selection of the second operation method.

6 Claims, 6 Drawing Sheets

(51) Int. Cl.

| | |
|---|---|
| *G05D 109/10* | (2024.01) |
| *G05D 111/30* | (2024.01) |
| *H04W 4/02* | (2018.01) |
| *H04W 4/40* | (2018.01) |

(52) U.S. Cl.
CPC ...... *G05D 2109/10* (2024.01); *G05D 2111/30* (2024.01)

(58) Field of Classification Search
USPC ........................................................... 701/2
See application file for complete search history.

(56) References Cited

U.S. PATENT DOCUMENTS

| | | | | |
|---|---|---|---|---|
| 11,747,891 | B1 * | 9/2023 | Hermsen ................. | G06F 3/147 |
| | | | | 345/156 |
| 2016/0107081 | A1 | 4/2016 | Hirai | |
| 2016/0241767 | A1 * | 8/2016 | Cho .................... | G06F 3/04842 |
| 2017/0160738 | A1 * | 6/2017 | Ganz ...................... | H04W 4/40 |
| 2018/0182261 | A1 * | 6/2018 | Naouri ................. | G09B 19/167 |
| 2018/0224847 | A1 * | 8/2018 | El Aile ................. | B62D 1/286 |
| 2018/0314230 | A1 * | 11/2018 | Adler ................. | G05B 19/0423 |
| 2019/0137999 | A1 | 5/2019 | Taguchi et al. | |
| 2020/0041992 | A1 | 2/2020 | Nagashima et al. | |
| 2020/0209888 | A1 | 7/2020 | Sakai et al. | |
| 2020/0326702 | A1 | 10/2020 | Iwamoto et al. | |
| 2021/0041894 | A1 | 2/2021 | Urano et al. | |
| 2021/0055741 | A1 | 2/2021 | Kawanai et al. | |
| 2021/0058173 | A1 | 2/2021 | Otaki et al. | |
| 2021/0072743 | A1 | 3/2021 | Otaki et al. | |
| 2021/0080943 | A1 | 3/2021 | Iwamoto et al. | |
| 2021/0350449 | A1 * | 11/2021 | Dagley ................. | G06F 16/23 |
| 2022/0024491 | A1 * | 1/2022 | Lee ........................ | B60K 35/28 |
| 2022/0105942 | A1 * | 4/2022 | Aso ...................... | B60W 30/12 |
| 2022/0194432 | A1 * | 6/2022 | Ide ................... | B60W 60/0053 |
| 2022/0219751 | A1 * | 7/2022 | Aradhyula ........... | G05D 1/0212 |
| 2023/0087202 | A1 * | 3/2023 | Lavoie ................. | G06F 1/1698 |
| | | | | 701/2 |
| 2023/0185298 | A1 * | 6/2023 | Boehm ................. | B60W 30/06 |
| | | | | 701/2 |
| 2024/0263966 | A1 * | 8/2024 | Ishiyama .............. | G01C 21/34 |

* cited by examiner

GENERATE TRAVEL
CONTROL INFORMATION Itc
BASED ON OPERATION A1

GENERATE TRAVEL
CONTROL INFORMATION Itc
BASED ON OPERATIONS A1 AND A2

PORTABLE TERMINAL AND VEHICLE CONTROL SYSTEM

CROSS-REFERENCE TO RELATED APPLICATION

This application claims priority to Japanese Patent Application No. 2023-137213 filed on Aug. 25, 2023, incorporated herein by reference in its entirety.

BACKGROUND

1. Technical Field

The present disclosure relates to a technique of operating a vehicle using a portable terminal.

2. Description of Related Art

Japanese Patent No. 6986518 discloses a system that controls entry and exit of a vehicle into and from a parking lot by operating a portable terminal via wireless communication. In this system, an image to be displayed on a touch panel of the portable terminal is changed according to whether the orientation of the portable terminal is landscape or portrait.

SUMMARY

In a system that operates a vehicle using a portable terminal, the manner of holding the portable terminal and the operation mode of the portable terminal with good operability may be different depending on the preference of an operator. Further, even for the same operator, the desired manner of holding the portable terminal and operation mode of the portable terminal may be different depending on the situation at the time of operating the vehicle, for example. Therefore, it is considered that the ability to appropriately change the manner of holding the portable terminal and the operation mode of the portable terminal according to the preference of the operator leads to improving the operability of the vehicle using the portable terminal.

The present disclosure has been made in view of the above issue, and has an object to provide a technique capable of improving the operability of a vehicle using a portable terminal.

An aspect of the present disclosure provides a portable terminal that is operated by an operator for operation of a vehicle and that performs wireless communication with the vehicle.

The portable terminal includes a sensor, a touch panel, and a processor.

The sensor detects an inclination direction and an inclination angle of the portable terminal.

The touch panel includes a display screen and detects a touch by the operator on the display screen.

The processor is configured to:

select one of first and second operation modes respectively corresponding to first and second holding modes, by which the operator holds the portable terminal, based on orientation information indicating an orientation of the portable terminal;

generate travel control information for travel control of the vehicle based on a tilting operation to tilt the portable terminal while the first operation mode is selected; and generate the travel control information based on the tilting operation and a touch operation at a predetermined position on the display screen while the second operation mode is selected.

According to the present disclosure, it is possible to improve the operability of a vehicle using a portable terminal.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
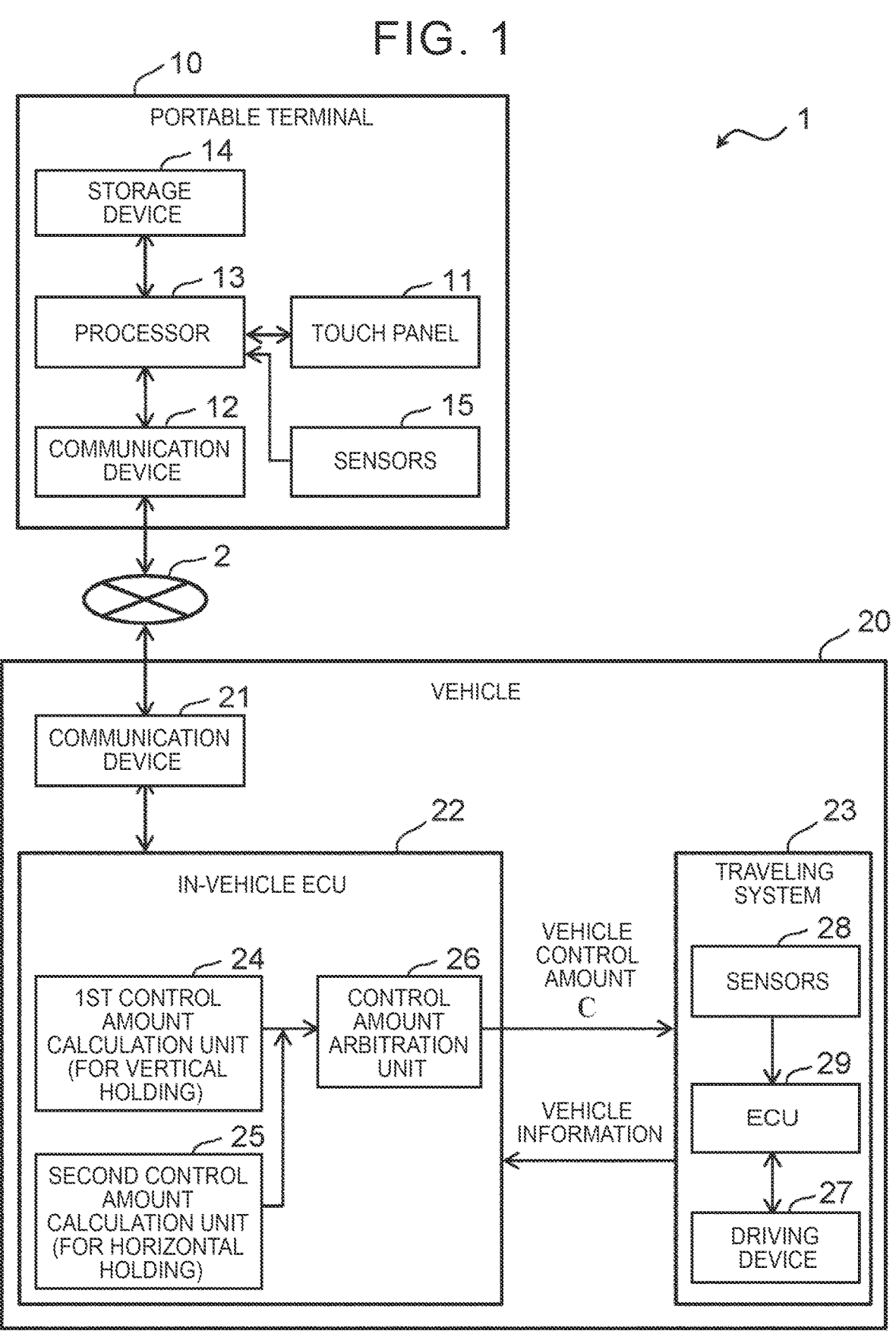
FIG. 1 is a schematic diagram illustrating an example of a configuration of a vehicle control system according to an embodiment.

1. A Vehicle Control System Comprising:

FIG. 1 is a schematic diagram illustrating an example of a configuration of a vehicle control system 1 according to an embodiment. The vehicle control system 1 includes a portable terminal (or simply a terminal) 10 and a vehicle 20. The terminal 10 is operated by an operator for operation (remote driving) of the vehicle 20. The terminal 10 performs wireless communication with the vehicle 20.

The terminal 10 includes, for example, a touch panel 11, a communication device 12, a processor 13, a storage device 14, and sensors 15. The touch panel 11 is formed on one plate surface of the terminal 10 and includes a display screen and a touch sensor. The touch sensor is configured to be able to detect a touch of an operator on a display screen. The communication device 12 is configured to be able to communicate with the vehicle 20 via the wireless communication network 2. The terminal 10 is, for example, a smart phone or a tablet terminal, and is formed in a plate shape (for example, a rectangular plate shape) in which one side is a longitudinal direction and the other side is a lateral direction (for example, refer to FIG. 2A). More specifically, for example, the touch panel 11 has a rectangular shape having a longitudinal direction and a lateral direction, and the longitudinal direction of the touch panel 11 coincides with the longitudinal direction of the terminal 10.

The processor 13 executes various processes for operating the vehicle 20 using the terminal 10. The storage device 14 stores various kinds of information necessary for processing by the processor 13. More specifically, the processor 13 executes various processes using various programs related to the operation of the vehicle 20. The various programs may be stored in the storage device 14 or may be recorded in a computer-readable recording medium. The sensors 15 include, for example, an inclination angle sensor and a position sensor. The inclination angle sensor detects an inclination direction and an inclination angle (posture) of the terminal 10. The inclination angle sensor includes, for example, a six-axis gyro sensor. The tilt angle of the terminal 10 is used for the operation of the vehicles 20 using the "tilt operation A1" described later. The position sensor includes a GNSS (Global Navigation Satellite System) receiver and detects a position and an orientation of the terminal 10.

The vehicle 20 includes a communication device 21 and an in-vehicle electronic control unit (an in-vehicle ECU) 22 and a traveling system 23. The communication device 21 communicates with the outside of the vehicle 20. For example, the communication device 21 communicates with the terminal 10 via the wireless communication network 2.

The in-vehicle ECU22 includes a processor (in-vehicle processor) and a storage device. The in-vehicle ECU22 generates the "vehicle control amount C" according to the "travel control information Itc" generated by the terminal 10. As will be described later, the in-vehicle ECU22 includes a first control amount calculation unit 24, a second control amount calculation unit 25, and a control amount arbitration unit 26 as a functional configuration related to generation of the vehicle control amount C. The vehicle control amount C is output to the traveling system 23.

The traveling system 23 includes a traveling device 27, sensors 28, and a ECU29. The traveling device 27 includes a steering device, a driving device, and a braking device. The steering device includes an electric motor that steers wheels. The drive device includes one or both of an electric motor and an internal combustion engine for driving the vehicle 20. The braking device includes a brake actuator for braking the vehicle 20. The sensors 28 include a recognition sensor, a vehicle state sensor, and a position sensor. The recognition sensor is, for example, a camera, and recognizes a situation around the vehicle 20. The vehicle state sensor detects a state of the vehicle 20. The vehicle state sensor includes, for example, a speed sensor, an acceleration sensor, a yaw rate sensor, and a steering angle sensor. The position sensor detects a position and an azimuth of the vehicle 20. For example, the position sensor includes a GNSS receiver. ECU29 controls the traveling of the vehicle 20 in accordance with the vehicle control amount C from the in-vehicle ECU22.

Note that, unlike the embodiment illustrated in FIG. 1, the function of the in-vehicle ECU22 may be provided in the terminal 10. That is, the terminal 10 may generate the vehicle control amount C after generating the travel control information Itc, and may output (transmit) the generated vehicle control amount C to the vehicle 20.

2. Vehicle Travel Control Using Portable Terminal 2-1. Holding the Terminal and Operating Method FIGS. 2A and 2B are each a diagram for explaining the first and second holding methods and the first and second operating methods of a portable terminal 10 shown in FIG. 1.

Figure 2A:
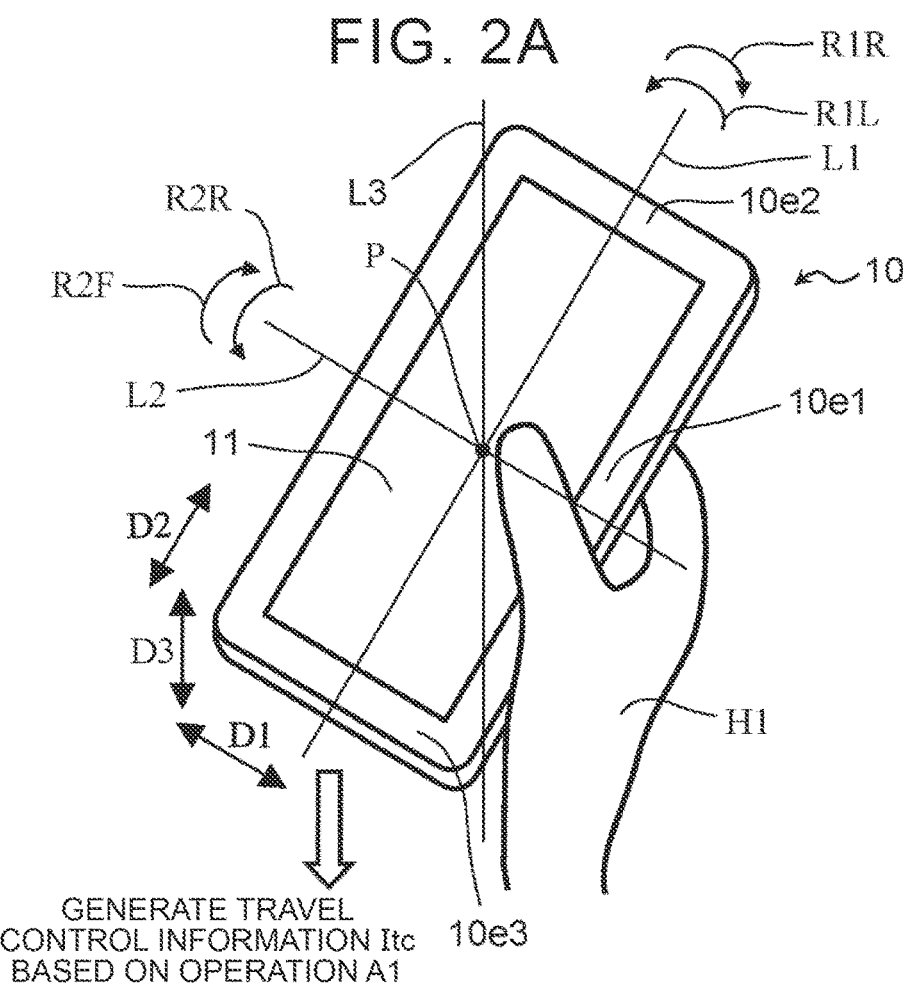
FIG. 2A is a diagram for explaining a first holding method and a first operating method of the portable terminal shown in FIG. 1.
Figure 2B:
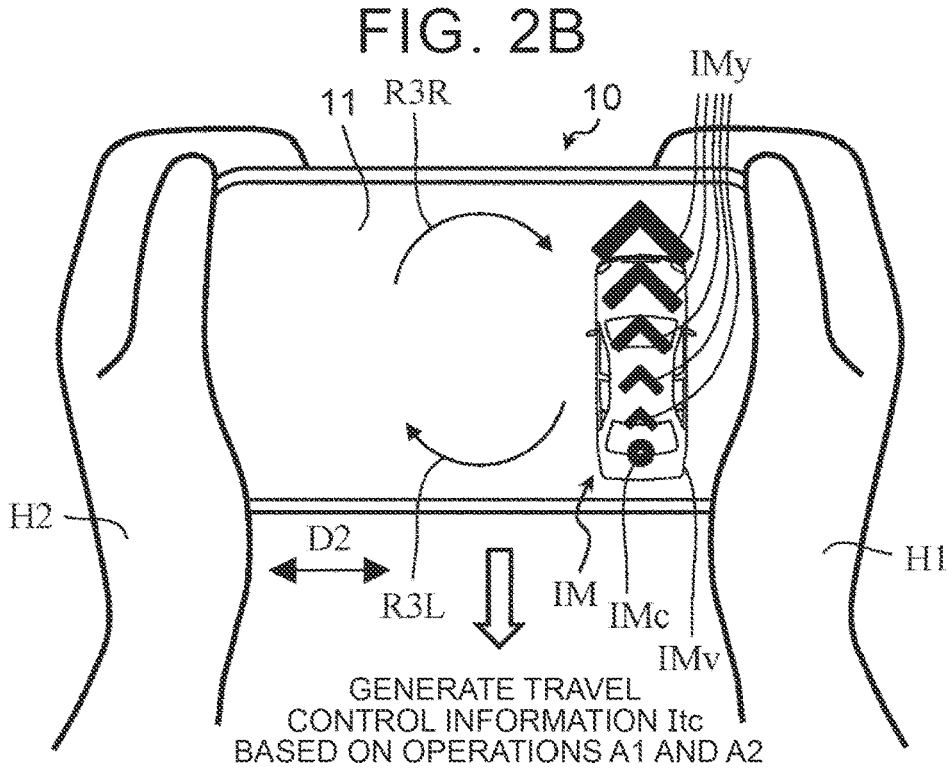
FIG. 2B is a diagram for explaining a second holding method and a second operating method of the portable terminal shown in FIG. 1.

As shown in FIG. 2A, the first holding method (or the vertical holding method) corresponds to the holding method in which one end 10e1 of the lateral direction D1 of the terminal 10 is held by one hand H1 of the operator. On the other hand, as shown in FIG. 2B, the second holding method (or lateral holding) corresponds to a method of holding both end 10e2 and 10e3 of the terminal 10 in the longitudinal direction D2 with both hands H1 and H2. In addition, in the present embodiment, from the viewpoint of fail-safe, the control of the travel (steering and speed) of the vehicle 20 by the first and second operation methods is enabled on condition that the operator continuously touches the touch panel 11.

2-1-1. Vertical Hold and First Operating Method

First, a first operation method corresponding to the vertical holding uses a "tilt operation A1" to control the steering and the velocity of the vehicles 20. Here, the tilt operation A1 refers to an operation of tilting the terminal 10 by an operator.

Specifically, in the first operation method, the steering of the vehicles 20 is controlled in accordance with a tilt operation A1 about a rotational axis parallel to the longitudinal direction D2. The rotational axis is parallel to a center line L1 (see FIG. 2A) extending through the center P of the terminal 10 and in the longitudinal direction D2. More specifically, according to the first operation method, the vehicle 20 is steered to the right in accordance with a tilt operation A1 in which the operator rotates the terminal 10 along the rotational direction R1R with respect to a predetermined reference state. The reference state referred to here is, for example, a state in which the center line L2 is level. More specifically, in the steering control, the target steering angle is set to be larger, for example, as the change in the tilt angle of the rotational direction R1R is larger. The target steering angle corresponds to an example of the vehicle control amount C described later with reference to FIG. 6. Similarly, the vehicle 20 is steered leftward in response to a tilt operating A1 in which the operator rotates the terminal 10 along the rotational direction R1L.

In the first operation method, the velocity of the vehicle 20 is controlled in accordance with a tilt operation A1 about a rotational axis that is parallel to the lateral direction D1. The rotational shaft is parallel to a center line L2 (see FIG. 2A) that passes through the center P of the terminal 10 and extends in the lateral direction D1. Here, "speed control of the vehicle 20" includes control of acceleration and deceleration of the vehicle 20. In addition, the control of the deceleration includes control of the braking. More specifically, according to the first operation method, the speed (forward speed) of the vehicle 20 is controlled in accordance with the tilt operation A1 in which the operator rotates the terminal 10 so that the end 10e2 of the terminal 10 farther from the operator is lowered with respect to the predetermined reference state (that is, along the rotational direction R2F). The reference state referred to here is, for example, a state in which the center line L1 is level. More specifically, the larger the variation of the tilt angle of the rotational direction R2F by the tilt operation A1 is, the higher the target vehicle speed or the target acceleration is. The target vehicle speed and the target acceleration correspond to an example of the vehicle control amount C described later together with FIG. 6. In addition, the retraction rate of the vehicles 20 may be controlled in response to a tilt operation A1 in which the operator rotates the terminal 10 such that the end 10e2 increases (i.e., along the rotational direction R2R). Further, by additionally using the shift range data of the vehicles 20, the control of the backward speed may also be executed based on the tilt operation A1 for rotating the terminal 10 in the rotational direction R2F.

During the selection of the first mode of operation, the processor 13 generates a travel control information Itc based on the tilt operation A1 described above. The travel control information Itc is information for controlling the travel of the vehicles 20 using the terminal 10. The travel control information Itc generated during the selection of the first operating mode is sensor information based on the detected value of the tilt angle sensor. More specifically, the travel control information Itc is an inclination angle of each inclination direction (the rotational direction R1R or R1L, and the rotational direction R2R or R2L; see FIG. 2A) and each inclination direction of the terminal 10.

2-1-2. Lateral Holding and Second Operation Method

Next, the second operation method corresponding to the lateral holding uses the "tilt operation A1" for the steering control, but uses the "touch operation A2" instead of the tilt operation A1 for the vehicle speed control.

Specifically, in the second operation method, the steering of the vehicles 20 is controlled in accordance with a tilt operation A1 about a rotational axis that is parallel to the thickness-direction D3 of the terminal 10. The rotating shaft is parallel to a center line L3 (see FIG. 2A) that passes through the center P of the terminal 10 and extends in the thickness-direction D3. More specifically, according to the second operation method, the vehicle 20 is steered to the right in accordance with a tilt operation A1 in which the operator rotates the terminal 10 along the rotational direction R3R (refer to FIG. 2B) with respect to a predetermined reference state. Then, the vehicle 20 is steered leftward in accordance with a tilt operation A1 in which the operator rotates the terminal 10 along the rotational direction R3L (refer to FIG. 2B). Here, the reference state is, for example, a state in which the center line L2 is parallel to the vertical plane.

In addition, the second operation method controls the velocity of the vehicles based on the touch operation A2. The touch operation A2 corresponds to an operation of touching (for example, tapping) a predetermined position on the display screen of the touch panel 11. The speed of the vehicle 20 is controlled in accordance with the touch position. In FIG. 2B, an image IM that is an exemplary image for displaying a touched position is shown. The image IM is displayed at a position where touching by a finger of one hand H1 is accepted, for example. As an example, the image IM includes an image IMc of a circle mark and an image IMy of a plurality of arrows differing in size, together with image IMv indicating the orientation of the vehicles 20. The image IMc is touched when the vehicles 20 are stopped. The plurality of images IMy indicates that the target vehicle speed is higher as the arrow is larger. According to the second operating method, the operator can control the velocity of the vehicles 20 by changing the touched position during IM of images. For example, the operator can start the vehicle 20 by changing the touch position from the image IMc to any of the image IMy. Conversely, by changing the touched position from any of the image IMy to the image IMc, the vehicles 20 can be decelerated (including braking) and stopped. In addition, the operator can accelerate the vehicle 20 by changing the touch position in the image IMy indicating the larger arrow, and conversely, can decelerate the vehicle 20 by changing the touch position in the image IMy indicating the smaller arrow. The speed control of the vehicle 20 based on the touch-operation A2 may be used not only for the control of the forward speed but also for the control of the backward speed.

During the selection of the second mode of operation, the processor 13 generates a travel control information Itc based on the tilt operation A1 and the touch operation A2 described above. The travel control information Itc generated during the selection of the second operating method is a combination of sensor information based on the detection value of the tilt angle sensor and sensor information based on the detection value of the touch sensor of the touch panel 11. More specifically, the travel control information Itc includes the tilt direction (rotational direction R3R or R3L; see FIG.

2B) of the terminal 10, the tilt angle of the tilt direction, and the touch position of the touch panel 11.

2-2. Selecting the Operation Method

The processor 13 of the terminal 10 selects one of the first and second operating methods based on the orientation information Io indicating the orientation of the terminal 10. The orientation information Io is either "vertical (information indicating the orientation of the terminal 10 when held vertically)" or "horizontal (information indicating the orientation of the terminal 10 when held horizontally)". The selection of such an operation method can be performed, for example, as in the following first selection example or second selection example.

2-2-1. First Selection Example

Figure 3:
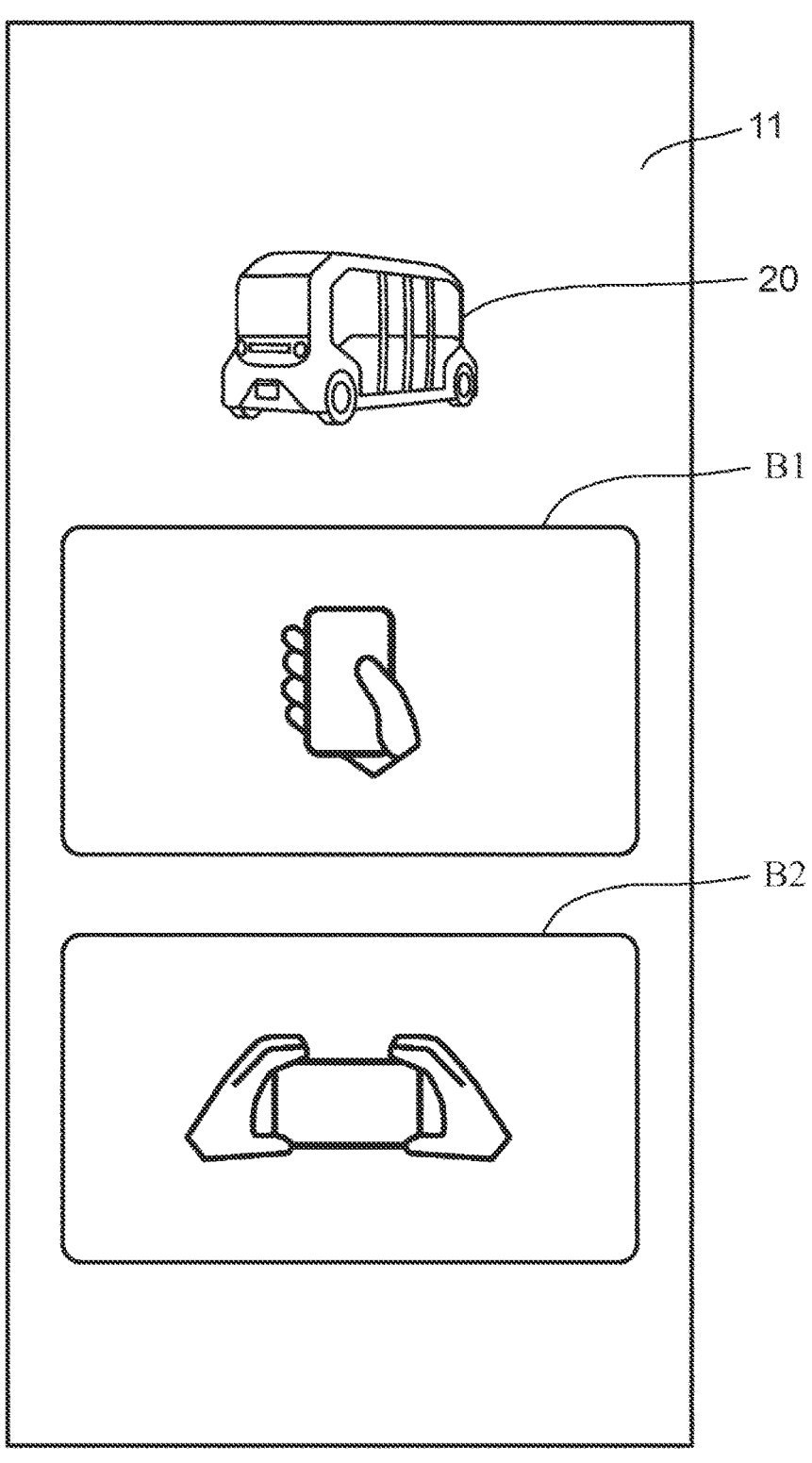
FIG. 3 is a diagram illustrating an example of a screen display of a touch panel used in the first selection example of the operation method of the portable terminal.

FIG. 3 is a diagram illustrating an example of a screen display of the touch panel 11 used in the first selection example of the operation method of the terminal 10.

In the embodiment illustrated in FIG. 3, two selection buttons B1 and B2 related to the operation method are displayed on the display screen together with the icons of the vehicles 20 to be operated. The selection button B1 is a button for accepting selection of the first operating method (vertically held) by the operator. The selection button B2 is a button for accepting selection of the second operating method (lateral holding) by the operator. The operator can select a desired operating method by touching the selection button B1 or B2. In addition, in this first selection, the "vertical" or "horizontal" corresponding to the selection button B1 or B2 selected by the operator corresponds to the orientation information Io.

Figure 4:
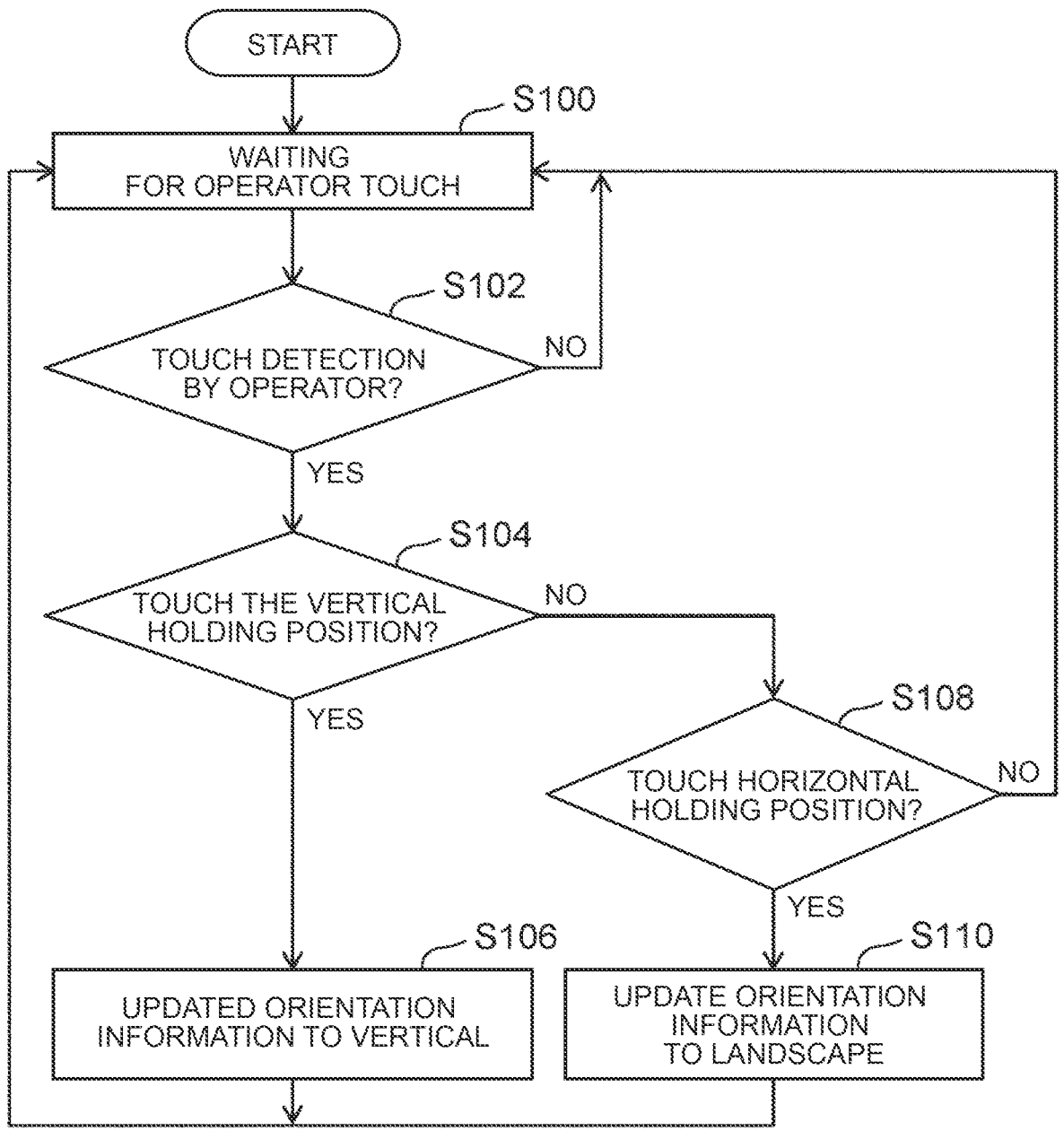
FIG. 4 is a flowchart illustrating an example of processing related to acquisition of orientation information according to the first selection example.

FIG. 4 is a flow chart illustrating an example of a process related to acquiring the orientation-information Io according to the first selection example. For example, the processing of this flowchart starts when the operator operates the terminal 10 to display the screen display shown in FIG. 3 on the touch panel 11, and ends when the operator turns off the screen display. In addition, the terminal 10 may be configured such that the operator can display the screen display illustrated in FIG. 3 only while the vehicle is stopped. That is, the terminal 10 (the processor 13) may accept switching (updating) of the direction (i.e., the vertical holding or the horizontal holding) of the terminal 10 by the operator on condition that the vehicle 20 is stopped.

At the beginning of the process of the present flow chart, an initial value is set as the orientation information Io. The initial value is, for example, a predetermined "vertical" or "horizontal". Alternatively, the initial value may be, for example, "vertical" or "horizontal" corresponding to the operation method used in the previous vehicle operation.

In S100, the processor 13 of the terminal 10 waits for a user's touch (e.g., tapping) (standby). Next, in S102, the processor 13 determines whether or not a touch on the touch panel 11 by the operator has been detected. Consequently, if the operator's touch is not detected (S102; No), the process returns to S100. On the other hand, if the operator touches (S102; Yes), the process proceeds to S104.

In S104, the processor 13 determines whether or not the touched position by the operator is the vertical holding position (selection button B1). Consequently, if the vertical holding position is touched (S104; Yes), the processor 13 proceeds to S106 and updates the orientation information Io to "vertical". That is, the processor 13 selects the first operation method corresponding to the vertical holding. The updated orientation information Io is stored in the storage device 14. Thereafter, the process returns to S100. In addition, in accordance with the selection of the first operation method, the processor 13 performs display related to the first operation method using the touch panel 11. The display includes, for example, a display indicating that the current operation method is the first operation method, and a display of vehicle information received from the vehicle 20.

On the other hand, when the touched position is not the vertically held position (S104; No), the process proceeds to S108. In S108, the processor 13 determines whether or not the touched position is the horizontal holding position (selection-button B2). Consequently, if the horizontal holding position is touched (S108; Yes), the processor 13 proceeds to S110 and updates the orientation information Io to "lateral". That is, the processor 13 selects the second operation method corresponding to the lateral holding. The updated orientation information Io is stored in the storage device 14. Thereafter, the process returns to S100. In addition, in accordance with the selection of the second operation method, the processor 13 performs display related to the second operation method using the touch panel 11. The display includes, for example, a display indicating that the present operation method is the second operation method, a display of the vehicle information received from the vehicle 20, and a display of the image IM shown in FIG. 2B.

When the touch position is neither the vertically held position nor the horizontal holding position (S108;No), that is, when the orientation information Io corresponding to the latest touch position indicates an abnormal value, the process returns to S100 without updating the orientation information Io.

2-2-2. Second Selection Example

The second selection example is different from the first selection example in the method of acquiring (updating) the orientation information Io. In the second selection example, the processor 13 updates the orientation information Io in the held direction when the terminal 10 is held in the fixed direction for a predetermined time or longer under the condition that the operator is not touching the touch panel 11. That is, in the second selection example, the orientation information Io is automatically updated by the processor 13 without accepting the selection of the holding method by touching by the operator.

Figure 5:
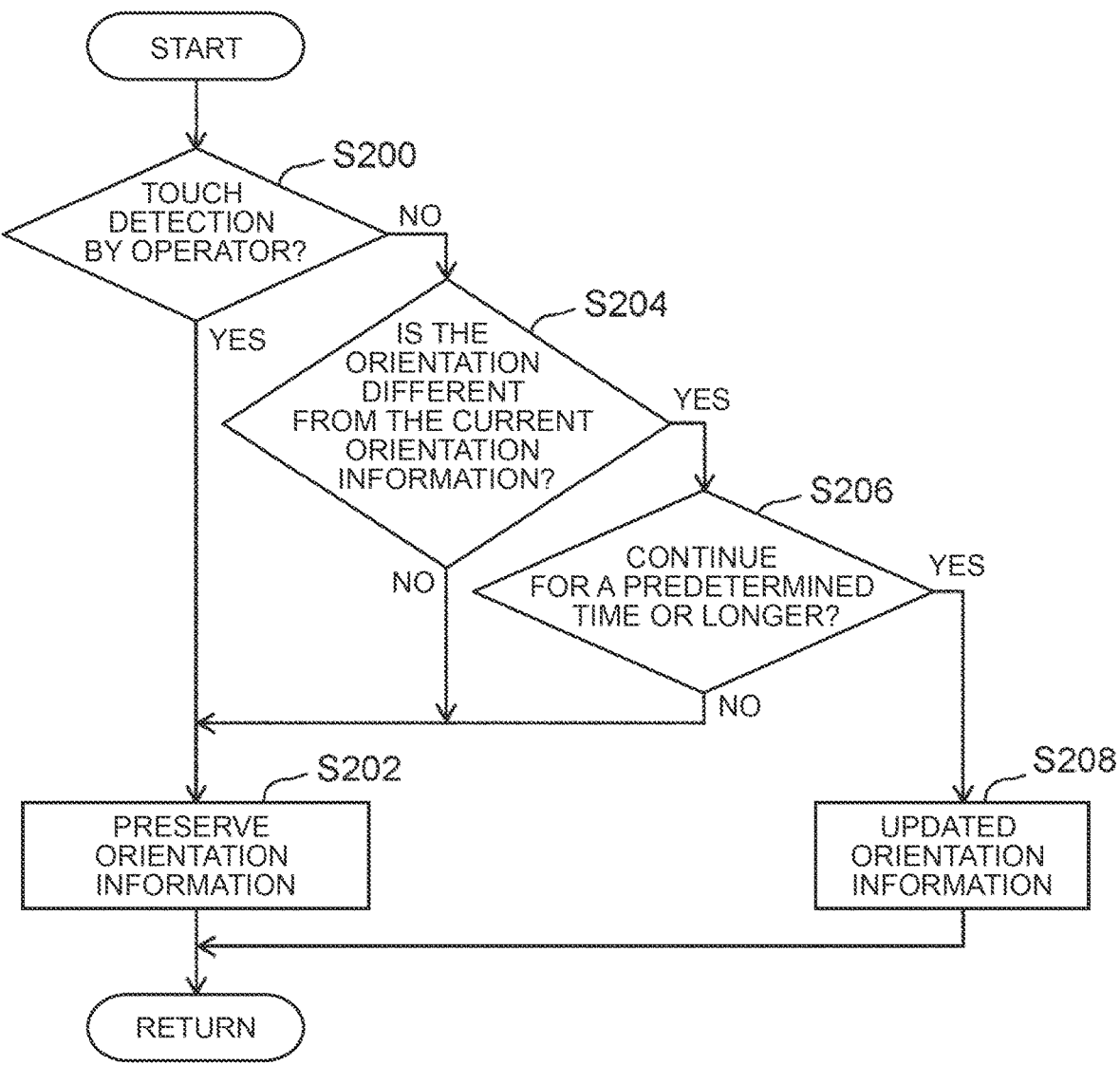
FIG. 5 is a flow chart illustrating an example of a process related to acquiring orientation information according to the second selection example.

FIG. 5 is a flow chart illustrating an example of a process related to acquiring the orientation information Io according to the second example of selection. For example, the processing of this flowchart is repeatedly executed during a period in which the operator operates the terminal 10 for the operation of the vehicle 20. Note that the processing of the flowchart illustrated in FIG. 4 and the processing of the present flowchart may be executed in parallel. That is, the first selection example and the second selection example may be used in combination for acquiring (updating) the orientation information Io and selecting the operating method.

In S200, the processor 13 determines whether or not a touch on the touch panel 11 by the operator is detected. Consequently, if the operator touches (S200; Yes), the process proceeds to S202.

In S202, the processor 13 holds the present orientation information Io stored in the storage device 14. That is, the processor 13 holds the present orientation information Io on condition that the touch on the touch panel 11 is continued. As a result, the 1 or 2 operation method currently selected is held On the other hand, if the operator is not detected (S200; No), the process proceeds to S204. In S204, the processor 13 determines whether the orientation of the terminal 10 detected by the tilt angle sensor differs from the present orientation information Io. Here, the "detected direction" is one of "vertical" and "horizontal" described above. Whether the direction is "vertical" or "horizontal" can be determined based on, for example, the inclination angle of the respective rotational directions of the terminal 10 (refer to FIGS. 2A and 2B).

If the detected orientation is equal to the orientation information Io (S204; No), the process proceeds to S202. On the other hand, if the detected orientation differs from the orientation information Io (S204; Yes), the process proceeds to S206.

In S206, the processor 13 determines whether or not the detected orientation that differs from the present orientation information Io has continued for a predetermined period or longer. Consequently, if the condition is not continued for a predetermined period or longer (S206; No), the process proceeds to S202. On the other hand, if the condition continues for a predetermined period or longer (S206; Yes), the process proceeds to S208.

In S208, the processor 13 updates the orientation information Io according to the "detected direction" while satisfying the respective determination conditions (S200;No, S204; Yes and S206; Yes).

2-3. Calculation and Arbitration of Vehicle Control Amounts

Figure 6:
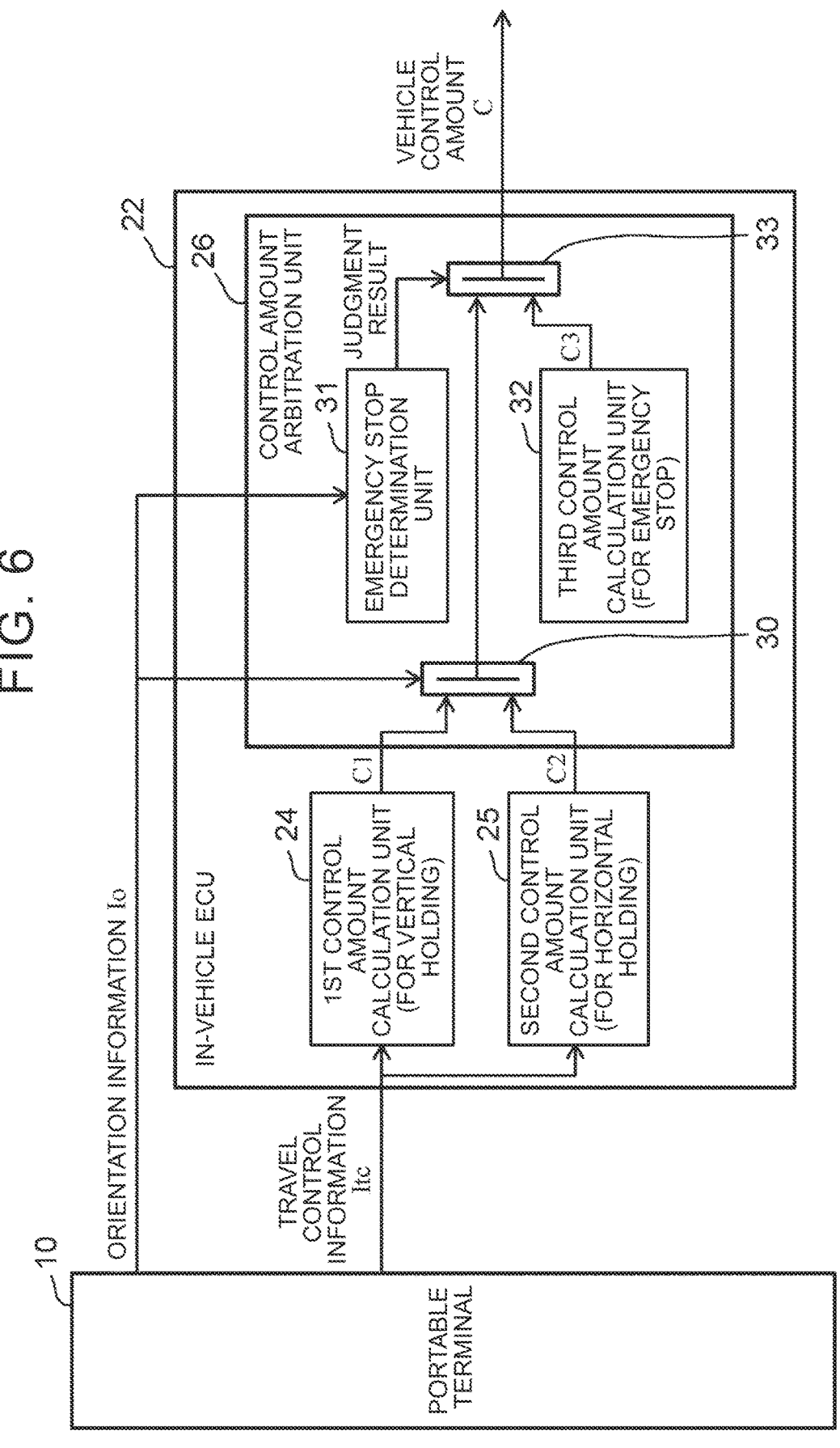
FIG. 6 is a diagram for explaining processing related to calculation and arbitration of the vehicle control amount.

FIG. 6 is a diagram for explaining processing related to calculation and arbitration of the vehicle control amount C. The travel control information Itc generated by the processor 13 of the terminal 10 is transmitted to the vehicles 20 via the wireless communication network 2. The orientation information Io acquired (updated) by the processor 13 is also transmitted to the vehicles 20.

As described above, the in-vehicle ECU22 includes the first control amount calculation unit 24, the second control amount calculation unit 25, and the control amount arbitration unit 26 as a functional configuration related to generation of the vehicle control amount C. The first control amount calculation unit 24 calculates the vehicle control amount C1 during the selection of the first operation method using the vertical holding based on the travel control information Itc corresponding to the tilt operation A1. Similarly, the second control amount calculation unit 25 calculates the vehicle control amount C2 during the selection of the second operation method using the lateral holding based on the tilt operation A1 and the travel control information Itc corresponding to the touch operation A2. More specifically, with respect to the steering control, the vehicle control amounts C1 and C2 may be, for example, the target steering angle described above, or may be, for example, the target yaw rate or the target lateral acceleration. With regard to the vehicle speed control, the vehicle control amounts C1 and C2 are, for example, the above-described target speeds or target accelerations.

As illustrated in FIG. 6, the control amount arbitration unit 26 includes a first switching unit 30, an emergency stop determination unit 31, a third control amount calculation unit 32, and a second switching unit 33.

The first switching unit 30 selects one of the vehicle control amounts C1 and C2 based on the orientation information Io and outputs the selected one to the second switching unit 33. Specifically, when the orientation information Io is "vertical", the first switching unit 30 outputs the vehicle control amount C1 for vertical holding. On the other hand, when the orientation information Io is "lateral", the first switching unit 30 outputs the vehicle control amount C2 for lateral holding. In addition, when the orientation information Io is a value (abnormal value) other than "vertical" and "horizontal", the first switching unit 30 holds the previous value of the currently selected vehicle control amount C1 or C2. When the vehicle control amount C is switched between the vehicle control amount C1 and the vehicle control amount C2, the vehicle control amount C may be gradually changed in order to suppress a sudden change in the vehicle control amount C.

The emergency stop determination unit (or simply the determination unit) 31 determines whether or not the vehicle 20 should be emergency stopped based on the orientation information Io and the vehicle information (vehicle speed information) from the traveling system 23. Specifically, when the conditional X1 that the vehicle speed is higher than 0 (while traveling) and that the orientation information Io is switched by the operator is satisfied, the determination unit 31 sets the emergency-stop flag to ON. The determination unit 31 also turns ON the emergency-stop flag when the orientation information Io is a value (abnormal value) other than "vertical" and "horizontal". When the emergency stop flag is ON, the determination unit 31 sets an emergency stop determination indicating that an emergency stop should be performed to ON. On the other hand, if the conditional X1 is not satisfied, the determination unit 31 sets the emergency-stop flag to OFF. When the emergency stop flag is OFF and the vehicle speed is 0 (stopped), the determination unit 31 sets the emergency stop determination to OFF. When the emergency stop flag is OFF but the vehicle speed is higher than 0, the determination unit 31 holds the previous value.

The third control amount calculation unit 32 calculates a vehicle control amount C3 for stopping the vehicle 20 in an emergency.

The second switching unit 33 selects one of the vehicle control amount C1 or C2 and the vehicle control amount C3 based on the determination result by the determination unit 31, and outputs the selected one to the traveling system 23. Specifically, when the emergency-stop determination is ON, the second switching unit 33 outputs the output (C1 or C2) from the first switching unit 30 to the traveling system 23. On the other hand, when the emergency stop determination is ON, the second switching unit 33 outputs the vehicle control amount C3 for emergency stop to the traveling system 23. When the vehicle control amount C is switched between the vehicle control amount C1 or C2 and the vehicle control amount C3, the vehicle control amount C may be gradually changed in order to suppress a sudden change in the vehicle control amount C.

According to the above-described control amount arbitration unit 26, the processor (in-vehicle processor) of the in-vehicle ECU22 executes a process of stopping the vehicle 20 in an emergency when the operator requests switching of the direction of the terminal 10 while the vehicle 20 is traveling based on the operation of the terminal 10. In an exemplary vehicle control system in which the terminal 10 has the function of an in-vehicle ECU22 instead of the vehicle 20, the process of stopping the vehicle 20 in an emergency is executed by the processor 13 or another processor.

3. Effect

As described above, the portable terminal 10 according to the present embodiment is configured to be able to select the first and second operation methods corresponding to the first and second holding methods, respectively. The first and second operation schemes are switched according to the orientation of the terminal 10. More specifically, as a specific example of the configuration, the terminal 10 is configured to be able to select the first and second operation methods corresponding to the vertical holding and the horizontal holding, respectively. Accordingly, the operator can appropriately change the holding manner and the operation manner of the terminal 10 according to his/her preference. Therefore, the operability of the vehicle 20 using the terminal 10 can be improved.

Further, as described with reference to FIG. 5, the terminal 10 retains the selected first or second operation method on condition that the operator continues to touch the touch panel 11. In other words, the terminal 10 is configured such that the operation method is not arbitrarily switched during the operation of the vehicle 20 by the operator. This also leads to an improvement in the operability of the vehicle 20 using the terminal 10.

Further, as described in association with the processing illustrated in FIG. 4, the terminal 10 (the processor 13) may accept the switching of the orientation of the terminal 10 by the operator on condition that the vehicle 20 is stopped. Accordingly, it is possible to switch the holding manner and the operation method of the terminal 10 while appropriately considering the safety of the vehicle traveling using the terminal 10.

Further, as described with reference to FIG. 6, in a case where the operator requests switching of the direction of the terminal 10 while the vehicle 20 is traveling, a process of causing the vehicle 20 to stop in an emergency may be executed. Accordingly, it is possible to switch the holding manner and the operation method of the terminal 10 while appropriately considering the safety of the vehicle traveling using the terminal 10.

What is claimed is:

1. A portable terminal that is operated by an operator to operate a vehicle and that performs wireless communication with the vehicle, the portable terminal comprising:
a sensor configured to detect an inclination direction and an inclination angle of the portable terminal;
a touch panel that includes a display screen and that is configured to detect a touch by the operator on the display screen; and
a processor, wherein the processor is configured to:
select one operation mode of the portable terminal between a first operation mode and a second operation mode based on orientation information indicating an orientation of the portable terminal, wherein the first operation mode and the second operation mode respectively correspond to a first holding method and a second holding method, the first holding method and the second holding method being orientations in which the operator holds the portable terminal;
generate travel control information for travel control of the vehicle based on a tilting operation, in a case where the first operation mode is selected, the tilting operation being an operation of tilting the portable terminal; and
generate the travel control information based on the tilting operation and a touch operation in a case where the second operation mode is selected, the touch operation being an operation of touching the display screen at a predetermined position, wherein
the portable terminal is in a plate shape having a longitudinal direction, a short-length direction, and a thickness direction;
the first holding method corresponds to holding one end of the portable terminal in the short-length direction with one hand of the operator;

the second holding method corresponds to holding both ends of the portable terminal in the longitudinal direction with both hands of the operator;

in a case where the first operation mode is selected, the processor is further configured to:

control steering of the vehicle according to the tilting operation about a rotational axis parallel to the longitudinal direction, and control a speed of the vehicle according to the tilting operation about a rotational axis parallel to the short-length direction; and in a case where the first operation mode is selected, the processor is further configured to:

control the steering of the vehicle according to the tilting operation about a rotational axis parallel to the thickness direction of the portable terminal, and control the speed of the vehicle based on the touch operation;

wherein the processor is configured to hold the selected first operating mode or the selected second operating mode in a case where the touch on the touch panel is continued.

2. The portable terminal according to claim 1, wherein the processor is configured to receive switching of the orientation by the operator in a case where the vehicle is stationary.

3. A vehicle control system comprising:

the portable terminal according to claim 1; and the vehicle including an in-vehicle processor, wherein the processor of the portable terminal or the in-vehicle processor is configured to execute a process of subjecting the vehicle to an emergency stop when the operator requests switching of the orientation in a case where the vehicle is traveling.

4. The portable terminal according to claim 1, wherein in a case where the first operation mode is selected, the processor is further configured to control an acceleration, a deceleration, and a braking of the vehicle according to the tilting operation.

5. The portable terminal according to claim 1, wherein in a case where the first operation mode is selected, the processor is further configured to control the speed of the vehicle to a higher target vehicle speed in response to a larger tilt angle of the tilt operation than in response to a smaller tilt angle of the tilt operation.

6. The portable terminal according to claim 1, wherein in a case where the second operation mode is selected, the display screen is configured to display images of a plurality of arrows as the predetermined position, the plurality of arrows being different in size, and the processor is further configured to control the speed of the vehicle to a higher target vehicle speed in response to a touch operation on a larger arrow than in response to a touch operation on a smaller arrow.

* * * * *